United States Patent
Lee

(10) Patent No.: US 7,457,077 B2
(45) Date of Patent: Nov. 25, 2008

(54) METHOD AND APPARATUS FOR OPTIMALLY WRITE REORDERING

(75) Inventor: Jae-sung Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 441 days.

(21) Appl. No.: 11/046,763

(22) Filed: Feb. 1, 2005

(65) Prior Publication Data
US 2005/0188151 A1  Aug. 25, 2005

(30) Foreign Application Priority Data
Feb. 21, 2004   (KR) ................... 10-2004-011658

(51) Int. Cl.
   *G11B 5/596* (2006.01)
   *G06F 12/00* (2006.01)
(52) U.S. Cl. .................. 360/78.08; 711/112
(58) Field of Classification Search .......... None
   See application file for complete search history.

(56) References Cited

U.S. PATENT DOCUMENTS 6,389,508 B1 *  5/2002  Tamura ................. 711/112
6,578,106 B1 *  6/2003  Price ..................... 711/111
6,657,811 B1 * 12/2003  Codilian ............... 360/78.06
6,754,036 B2 *  6/2004  Dehnert ................ 360/78.07
6,940,684 B2 *  9/2005  Yoshioka et al. ..... 360/78.06

FOREIGN PATENT DOCUMENTS

| JP | 3-276425 | 12/1991 |
| JP | 5-314687 | 11/1993 |
| JP | 1998-23971 | 7/1998 |
| JP | 1999-38356 | 6/1999 |

* cited by examiner

Primary Examiner—Joseph Feild
Assistant Examiner—Jason Olson
(74) Attorney, Agent, or Firm—Staas & Halsey LLP

(57) ABSTRACT

A method and apparatus to perform write reordering. The method includes extracting a seek time table containing seek times corresponding to a desired seek speed among different seek times to a surface of a disk, and reordering an order to write a data in a plurality of writing positions on the surface of the disk by use of the seek time table extracted. A performance of a hard disk drive optimizes the write reordering under a current condition.

34 Claims, 5 Drawing Sheets

FIG. 4

| SEEK TIME TABLE 1 | |
|---|---|
| TRACK INTERVAL | SEEK TIME |
| 5 | 40 |
| 10 | 50 |
| 30 | 60 |
| 120 | 100 |
| 600 | 140 |
| 2000 | 180 |
| 4000 | 200 |
| 10000 | 300 |

| SEEK TIME TABLE 2 | |
|---|---|
| TRACK INTERVAL | SEEK TIME |
| 5 | 50 |
| 10 | 70 |
| 30 | 110 |
| 120 | 140 |
| 600 | 180 |
| 2000 | 200 |
| 4000 | 300 |
| 10000 | 400 |

| SEEK TIME TABLE 3 | |
|---|---|
| TRACK INTERVAL | SEEK TIME |
| 5 | 80 |
| 10 | 100 |
| 30 | 140 |
| 120 | 180 |
| 600 | 200 |
| 2000 | 300 |
| 4000 | 400 |
| 10000 | 500 |

METHOD AND APPARATUS FOR OPTIMALLY WRITE REORDERING

CROSS-REFERENCE TO RELATED APPLICATION

This application claims the priority of Korean Patent Application No. 2004-11658, filed on Feb. 21, 2004, in the Korean Intellectual Property Office, the disclosure of which is incorporated herein in its entirety by reference.

BACKGROUND OF THE INVENTION

1. Field of the Invention

The present invention relates to a method and apparatus to improve storage capacity of a hard disk drive, and, more particularly, to a method and apparatus to perform write reordering.

2. Description of the Related Art

FIG. 1 is a view depicting a conventional write reordering method.

Referring to FIG. 1, after data 1, 2 and 3 are received from a host, the data 1 among the received data is written, and the data 2 and 3 remain in a state in which they are ready to be written. At this time, an access time when the data 2 and the data 3 gain access to several positions of a surface of the disk in which the data is to be written is computed. This access time is the sum of a seek time (i.e., the time required for a head to vertically move tracks) and a sector arrival time (i.e., the time required for the head to horizontally move tracks). The seek time is determined by a moving speed of the head, while the sector arrival time is determined by a rotating speed of the disk.

A time required to move the head from the sector into which the data 1 is written to the sector into which the data 2 is to be written in a direction that is perpendicular to the tracks will be referred to as ST2, while a time required to move the head from the moved position where the data 2 is to be written in a direction that is horizontal to the tracks will be referred to as SA2. A time required to move the head from the sector into which the data 1 is written to the sector into which the data 3 is to be written in a direction that is perpendicular to the tracks will be referred to as ST3, while a time required to move the head from the moved position where the data 3 is to be written in a direction that is horizontal to the tracks will be referred to as SA3. Accordingly, the access time AT2 when the head gains access to the position where the data 2 is to be written from the current position is ST2+SA2, while the access time AT3 when the head gains access to the position where the data 3 is to be written from the current position is ST3+SA3. In view of the rotation of the disk and a relationship of AT2 being greater than AT3, writing the data 3 before writing the data 2 is effective. In this case, according to the conventional write reordering method, the write order is reordered in order of the data 1, then the data 3 and then the data 2.

When the head is moved, an accelerating section, a constant velocity section and a decelerating section operate. Therefore, a seek speed is not increased in relation to the moving distance of the head. Specifically, if a ratio of the accelerating section and the decelerating section is large, the seek speed is slow. If a ratio of the constant velocity section is large, the seek speed is fast. A conventional hard disk drive stores seek times associated with every moving distance. As such, a problem exists in that when the moving speed of the head is varied by any cause, the stored seek times are not consistent with each other. In addition, in the case in which write reordering is performed, an incidence of inconsistent seek times may significantly reduce a performance of the hard disk drive.

SUMMARY OF THE INVENTION

Therefore, the present invention provides a method and apparatus to perform write reordering in which, when a moving speed of a head is varied by any cause, a seek time table that is suitable for the varied moving speed of the head is utilized.

According to an aspect of the present invention, a write reordering method comprises operations extracting a seek time table to contain seek times corresponding to a desired seek speed among different seek times to a surface of a disk, and reordering an order to write data in a plurality of writing positions on the surface of the disk using of the extracted seek time table.

According to another aspect of the present invention, a hard disk drive comprises a seek time table extracting unit of a seek time table to contain seek times corresponding to a desired seek speed among different seek times to a surface of a disk; and a write reordering unit to reorder an order to write data in a plurality of writing positions on the surface of the disk using of the extracted seek time table that is extracted from the seek time table extracting unit.

According to another aspect of the present invention, a disk writing method comprises operations of computing seek times from a current position to a plurality of writing positions on a surface of a disk using a desired seek time among different seek times to a surface of a disk; and writing data in a position requiring a minimum access time among the computed access times.

According to another aspect of the present invention, a computer-readable storage medium stores a program to execute a write reordering method.

According to another aspect of the present invention, a computer-readable storage medium stores a program to execute the disk writing method.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 are views depicting a seek time table according to the embodiment of the present invention shown in FIG. 1.

DETAILED DESCRIPTION OF THE PREFERRED EMBODIMENTS

Figure 1:
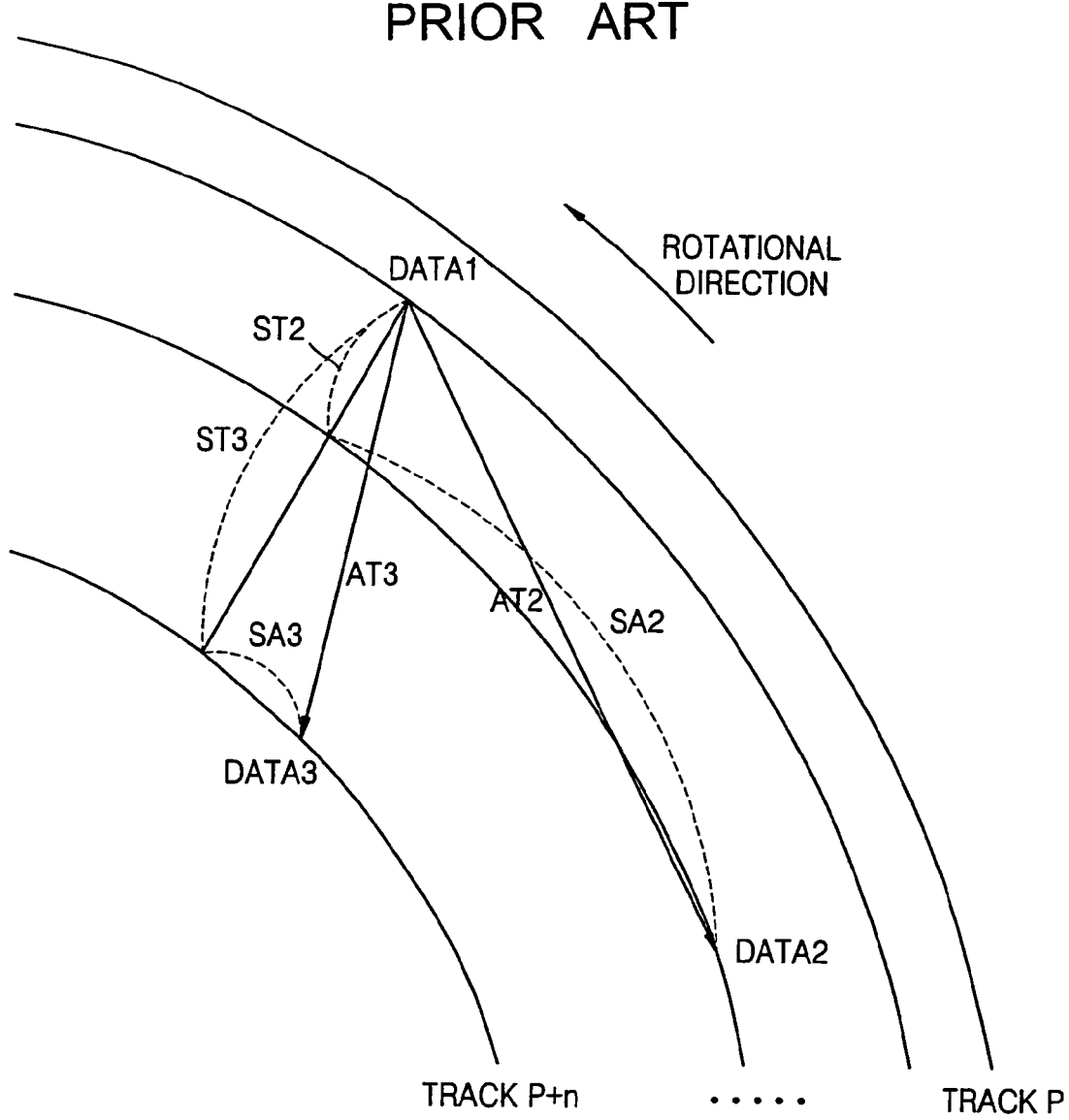
FIG. 1 is a view depicting a conventional write reordering method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
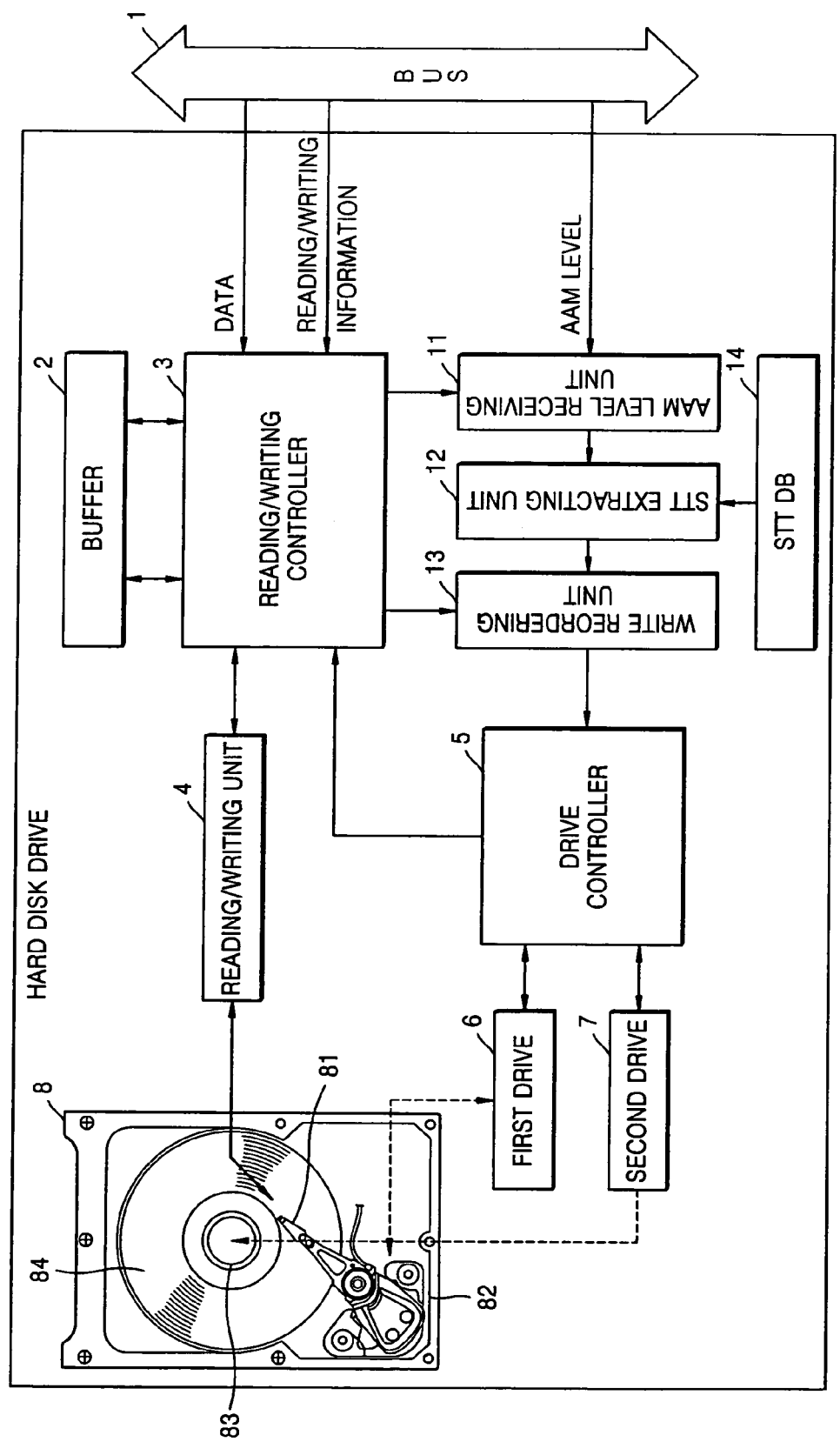
FIG. 2 is a schematic view of a hard disk drive according one embodiment of the present invention.

FIG. 2 is a schematic view of a hard disk drive according to an embodiment of the present invention.

Referring to FIG. 2, the hard disk drive includes an Automatic Acoustic Management (AAM) level receiving unit 11, a seek time table extracting unit 12, a write reordering unit 13, a buffer 2, a reading/writing controller 3, a reading/writing unit 4, a drive controller 5, and a hard disk assembly (HDA) 8. The HDA 8 includes a head 81, an actuator 82, a spindle motor 83, and a disk 84. The disk 84, in this case, refers to a plurality of disks. A head to write data on a surface of the disk or to read the data from the surface of the disk is mounted to a surface of each disk. The actuator 82 serves to move the heads to particular positions on the disk onto which the data is written and/or from which the data is read. Meanwhile, the spindle motor 83 rotates the disks.

The AAM level receiving unit 11 receives a desired AAM level among AAM levels according to the AAM regulating noise levels in proportion to seek speed. The hard disk drive generally operates under optimum conditions. According to the increased performance of the hard disk drive, however, the operating speed of the HDA 8, which, as noted above, is a mechanical part to write the data onto a surface of the disk 84 and/or to read the data from the surface of the disk, is also increased. As a result noise is increased. Accordingly, reducing the noise, even though performance may be sacrificed to a small extent, becomes necessary. The committee T13 (a Technical Committee for the InterNational Committee on Information Technology Standards (INCITS)) regulates the AAM in detail while operating under rules approved by the American National Standards Institute (ANSI).

Figure 3:
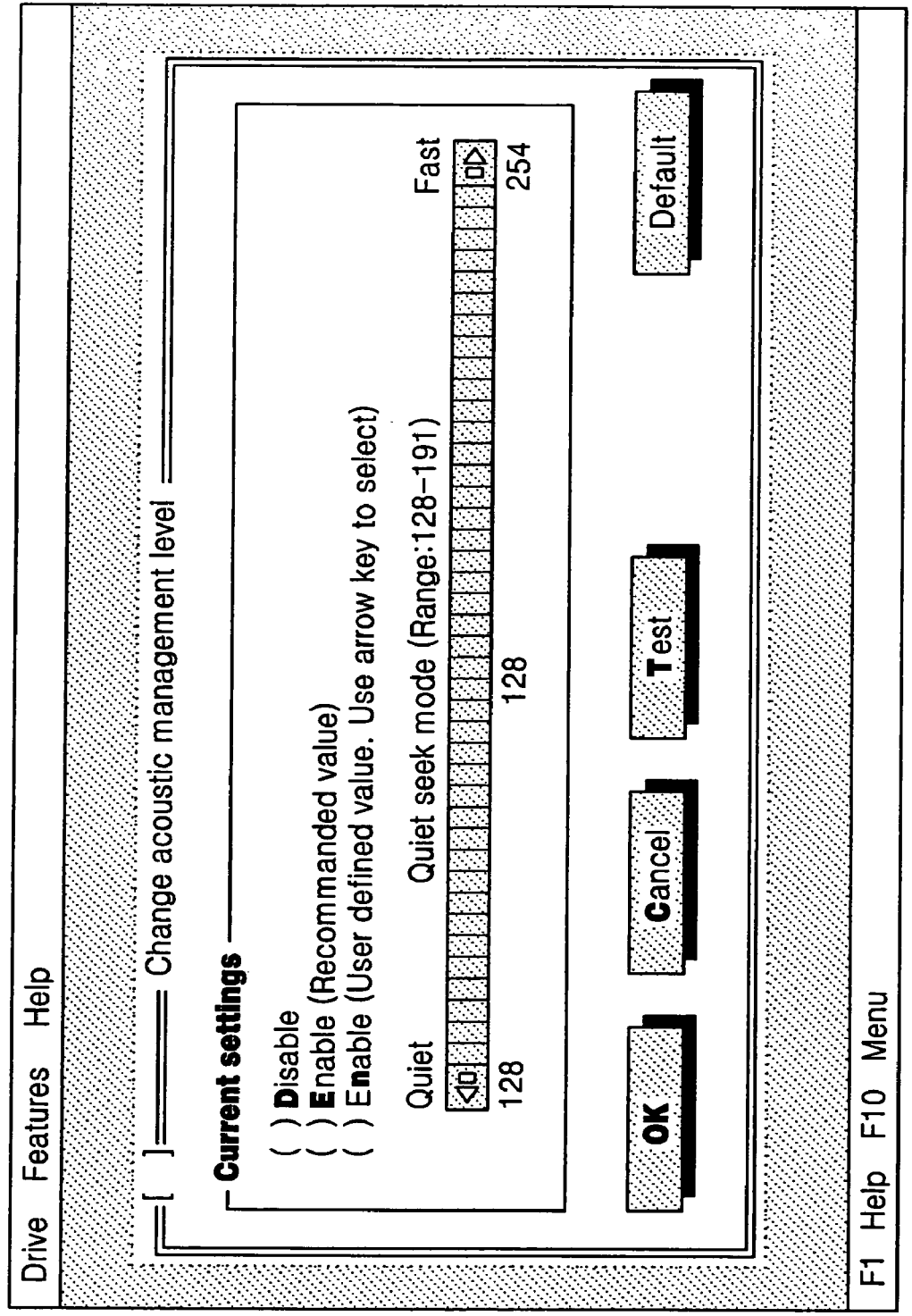
FIG. 3 is a view depicting a level changing screen of automatic acoustic management (AAM) employed in the embodiment of the present invention shown in FIG. 1.

FIG. 3 is a view to depict an AAM level changing screen that may be employed in the embodiment of the present invention.

Referring to FIG. 3, the AAM level changing screen provides three options. The first option allows a user to disable the AAM, the second option allows the user to employ a recommended value, and the third option allows the user to select the AAM level. If the third option is selected, a user may select a desired AAM level using a marker that is depicted in FIG. 3. The more the marker is moved toward the left side of the scale depicted in FIG. 13, the more performance may be lowered while the noise of the HDA may be reduced. If the marker is moved toward the right side of the scale, the more noise may be increased, while performance may be improved. If the user selects the desired AAM level, the AAM level receiving unit 11 receives the selected AAM level via a bus 1.

Again referring to FIG. 2, the seek time table extracting unit 12 extracts the seek time table corresponding to the AAM level that is received by the AAM level receiving unit 11 from a database 14 of seek time tables corresponding to each AAM level provided from the hard disk drive. The actuator 82 determines a speed of the head according to the AAM level. The seek speed is a speed of the head moving in a direction that is perpendicular to the surface of the disk 84. Therefore, the seek speed of the head is varied depending upon the AAM level.

FIG. 4 are views depicting the seek time table according to the embodiment of the present invention.

Referring to FIG. 4, three seek time tables that correspond to three AAM levels are shown. Among these seek time tables, seek time table 1 corresponds to a fast mode that is set to maximize the performance of the disk drive and would, most likely, be used where the user is not concerned with the noise that is generated by the disk drive. Seek time table 2 corresponds to a middle mode that is set to have intermediate performance and noise of the disk drive. Meanwhile, seek time table 3 corresponds to a quiet mode that is set to minimize the noise of the disk drive and would, most likely, be used where the user is not concerned with the performance of the disk drive.

That the seek time, relative to an interval between the same track, is gradually increased toward the quiet mode is to be understood. Further, a unit of the seek time is $1/256$ of a track resolution time. For example, if the track interval is 2 and the seek time is 30, a time that is equivalent to 30/256*(1 track resolution time) would be required to seek two tracks. These seek time tables are stored in the seek time table database 14. If the seek time table extracting unit 12 extracts the seek time table corresponding to the current AAM level (i.e., the current moving speed of the head 81), from the database 14 of seek time tables, the write reordering unit 13 may compute the correct access time to the writing position by using the extracted seek time. The access time is the sum of the required seek time (i.e., when moving the head in a direction that is perpendicular to the tracks), and a required sector arrival time (i.e., when moving the head in a direction that is horizontal to the tracks). That is, the access time refers to the total time that is required to move the head to the writing position.

Again referring to FIG. 2, if the reading/writing controller 3 receives any of the data and/or the writing information in order to write the data via the bus 1, the received data and writing information are stored in the buffer 2. Thus, when amounts of the data and writing information that are stored in the buffer 2 increases above a predetermined capacity, the reading/writing controller 3 is ready to write the stored data on the surface of the disk 84. The reading/writing controller 3 outputs the writing information stored in the buffer 2 to the write reordering unit 13. Herein, the writing information includes a logical writing position, a size of the data and the like.

The write reordering unit 13 then reorders the order of the data to be written onto the disk in order to write the data in a plurality of writing positions on the surface of the disk 84 using the seek time table that is extracted from the seek time table extracting unit 12. Specifically, the write reordering unit 13 computes physical writing positions on the basis of the logical writing positions of the data stored in the buffer 2 (i.e., the data ready to be written on the surface of the disk). Herein, the logical writing position is position information identified at the host, and is generally referred to as logical block addressing (LBA). In addition, the physical writing position is position information identified at the disk, and is generally referred to as an address of physical cylinder head sector (CHS).

Then, the write reordering unit 13 computes the seek times and the sector arrival times with regard to the computed physical writing positions. The write reordering unit 13 adds up the computed seek times and the sector arrival times to compute the access times. Then, the write reordering unit 13 reorders the order to write the data in dimensional order of the access times. The write reordering unit 13, of this embodiment, outputs the position information of the position requiring the minimum access time to the drive controller 5, thereby performing the write reordering of the data. The write reordering unit 13 receives new logical writing positions from the reading/writing controller 3, and the above process is repeated. Specifically, whenever the above process is performed once, new data is written in the writing position. Since the disk 84 is always rotated at a constant speed, the current position is varied every moment. Since the access time is varied until other standby data is written, if the data is written in one writing position, the write reordering is again performed.

The drive controller 5 generates a signal to drive the actuator moving the head on the basis of the order that is generated by the reordering that is completed by the write reordering unit 13. The drive controller 5 of this embodiment receives the position information regarding the position that requires the minimum access time from the write reordering unit 13, generates a signal to control the actuator 82 to move the head 81 to a position according to the received position information, and outputs the generated signal to a first drive 6. In addition, the drive controller 5 generates a signal to control the spindle motor 83 and outputs the generated signal to a second drive 7. Since the spindle motor 83 is continuously rotated at constant speed, the signal is applied only when the power is turned on and off.

The first drive 6 controls the actuator 82 according to the control signal that is received from the drive controller 5. If the movement of the head 81 to the position that requires the minimum access time is completed according to the control, the first drive outputs a signal that is indicative of the completion of the movement of the head 81 to the drive controller 5. The drive controller 5 receives the signal, and outputs a signal to instruct the writing of the data to the reading/writing controller 3. The actuator 82 generally includes a voice coil motor, and the first drive 6 generates and outputs a signal to control the voice coil motor. The second drive 7 rotates the spindle motor 83 at a constant speed according to the control signal received from the drive controller 5.

If the reading/writing controller 3 receives the signal to instruct the writing of the data from the drive controller 5, the reading/writing controller 3 outputs the data to be written in the position that is required for the minimum access time to the reading/writing unit 4. If the reading/writing unit 4 receives the data from the reading/writing controller 3, the reading/writing unit 4 converts the input data into a shape, which may be written on the surface of the disk 84, and outputs the converted data to the head 81. If the head receives the data from the reading/writing controller 3, the head 81 writes the input data on the surface of the disk 84.

Figure 5:
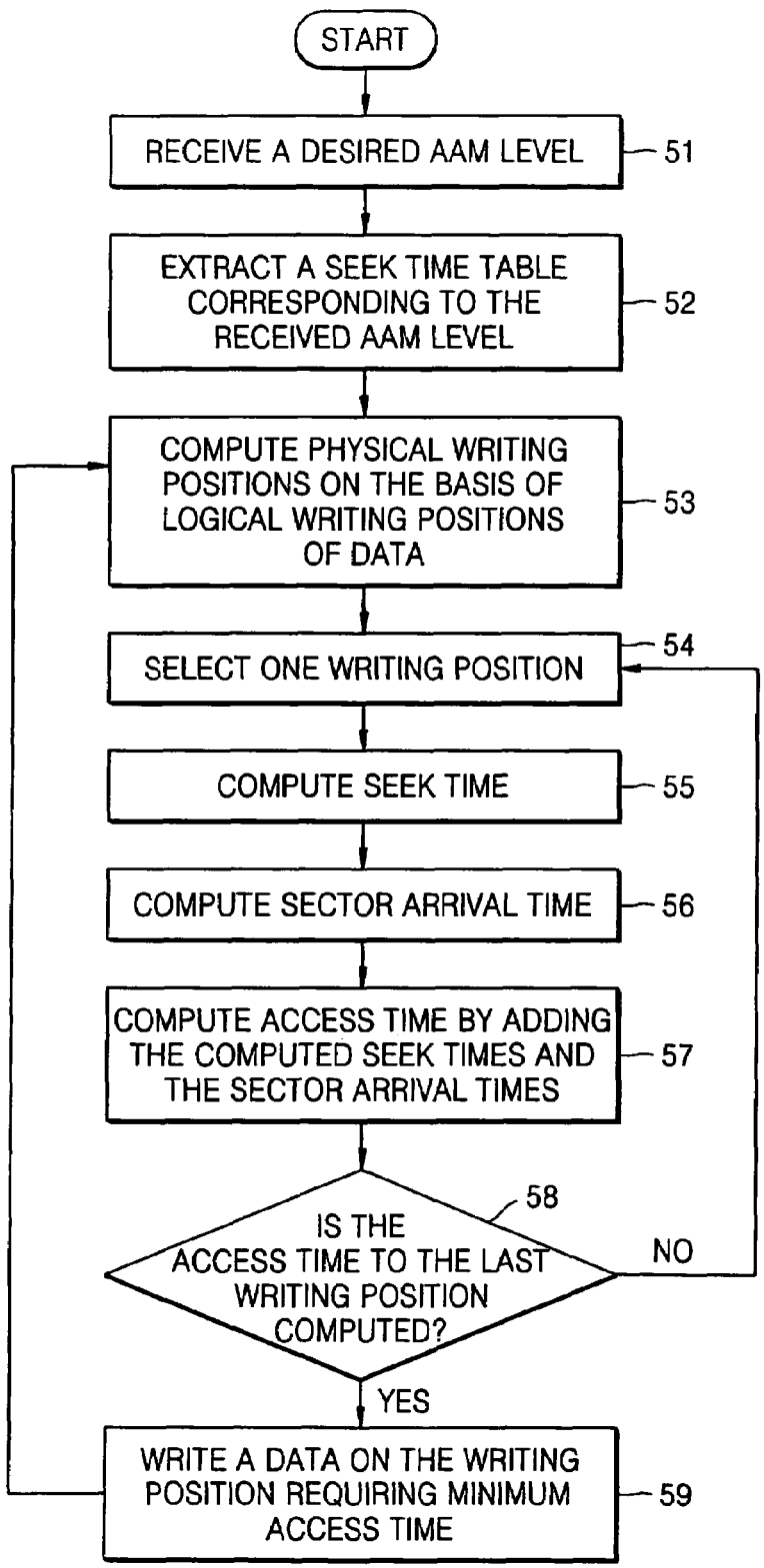
FIG. 5 is a flow chart of a disk writing method according to another embodiment of the present invention.

FIG. 5 is a flow chart of the disk writing method according to one embodiment of the present invention.

Referring to FIG. 5, the disk writing method includes the following, and is performed in the hard disk drive shown in FIG. 2. Accordingly, the technique of performing write reordering of the hard disk drive is applied to this embodiment.

The desired AAM level is received among AAM levels (51). The seek time table corresponding to the received desired AAM level, i.e., a desired seek time, is extracted from the database 14 of seek time tables (52). The access times from the current position to the plurality of writing positions on the surface of the disk are computed by use of the extracted seek time table. In other words, the access times are computed using the desired seek time from among different seek times to the surface of the disk 84. Specifically, physical writing positions based on the logical writing positions of the data stored in the buffer 2 (i.e., the data, ready to be written on the surface of the disk, are computed) (53). One physical writing position is selected from among the computed physical writing positions (54). The seek time on the computed physical writing position is computed with reference to the seek time table (55). Then, the sector arrival time to the computed physical writing position is computed with reference to the rotation speed of the disk 84 (56). The computed seek times and the sector arrival times are added to compute the access time (57). Then, the above process is repeated from operation 54, until the access time to the last writing position is computed (58). The data is written in the position that requires the minimum access time among the computed access times (59). Specifically, whenever the process is performed once from operation 53, the data is written in one writing position.

If the embodiments of the present invention are to be performed by software, constitutional units of the present invention are necessarily code segments to execute a necessary operation. Programs or code segments may be stored in a processor-readable medium, or may be sent by a computer data signal that is combined with a carrier wave via a transferring medium or communication network. The processor-readable medium includes any medium capable of storing or sending information.

Examples of the processor-readable medium include an electronic circuit, a semiconductor memory device, a ROM, a flash memory, an erasable ROM, a floppy disk, an optical disk, a hard disk, and the like. The computer data signal includes any signal, which may be transmitted through transmission medium. Examples of transmission mediums that may be used include an electronic network channel, an optical fiber, air, an electromagnetic field, an RF network, and the like.

With the present invention, when a moving speed of a head is varied by any cause, a seek time table that is suitable for the varied moving speed of the head is utilized, so that a performance of a hard disk drive optimizes the write reordering under a current condition.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A write reordering method, comprising:
    extracting a seek time table to contain seek times corresponding to a desired seek time from among different seek times to a surface of a disk via a predetermined database of seek time tables; and
    reordering an order to write data in a plurality of writing positions on the surface of the disk based upon the one of the different seek times that corresponds to a current seek speed.

2. The write reordering method as claimed in claim 1, wherein the seek time corresponds to a speed of a head moving in a direction that is perpendicular to tracks on the surface of the disk.

3. The write reordering method as claimed in claim 1, wherein the seek time is a time required to move a head along a desired track interval in a direction that is perpendicular to tracks on the surface of the disk.

4. The write reordering method as claimed in claim 1, further comprising receiving a desired AAM (automatic acoustic management) level among AAM levels according to AAM regulating noise levels that are proportional to the seek times;
    wherein the extracting the seek time table corresponds to the received AAM level via the database of seek time tables, the seek time tables corresponding to each AAM level.

5. The write reordering method as claimed in claim 1, wherein the reordering comprises:
    computing the plurality of writing positions on a standby data to be written on the surface of the disk;

computing the seek times and sector arrival times to the plurality of computed writing positions;

adding up the computed seek times and sector arrival times to compute access times; and reordering the order of writing the data in dimensional order of the access times.

6. A hard disk drive comprising:

a seek time table extracting unit to extract a seek time table containing seek times corresponding to a desired seek time among different seek times to a surface of a disk via a predetermined database of seek time tables; and a write reordering unit to reorder an order to write a data in a plurality of writing positions on the surface of the disk based upon the one of the different seek times that corresponds to a current seek speed.

7. The hard disk drive as claimed in claim 6, wherein the seek time corresponds to a speed of a head moving in a direction that is perpendicular to tracks on the surface of the disk.

8. The hard disk drive as claimed in claim 6, wherein the seek time is a time required to move a head along a desired track interval in a direction that is perpendicular to tracks on the surface of the disk.

9. The hard disk drive as claimed in claim 6, further comprising an AAM level receiving unit to receive a desired AAM (automatic acoustic management) level among AAM levels according to AAM regulating noise levels in proportion to the seek speeds;

wherein the seek time table extracting unit extracts the seek time table corresponding to the AAM level from the database of seek time tables, the seek time tables corresponding to each AAM level.

10. The hard disk drive as claimed in claim 6, wherein the write reordering unit computes the plurality of writing positions on a standby data to be written on the surface of the disk, computes the seek times and sector arrival times to the plurality of computed writing positions, adds up the computed seek times and sector arrival times to compute access times, and reorders the order of writing the data in dimensional order of the access times.

11. The hard disk drive as claimed in claim 6, further comprising a drive controller to generate a signal to drive an actuator moving a head based on an order reordered by the write reordering unit.

12. A disk writing method, comprising:

computing access times from a current position to a plurality of writing positions on a surface of a disk using a desired seek time among different seek times to the surface of the disk via a predetermined database of seek time tables;

writing a data in a position that requires a minimum access time among the computed access times; and reordering an order to write the data based upon the one of the different seek times that corresponds to a current seek speed.

13. The disk writing method as claimed in claim 12, wherein the seek time is a speed of a head moving in a direction that is perpendicular to tracks on the surface of the disk.

14. The disk writing method as claimed in claim 12, wherein the access time is the sum of the seek time required to move a head in a direction that is perpendicular to tracks and a sector arrival time required to move the head in a direction that is horizontal to the tracks.

15. The disk writing method as claimed in claim 12, further comprising receiving a desired AAM (automatic acoustic management) level among AAM levels according to AAM regulating noise levels in proportion to the seektimes;

wherein the extracting extracts the seek time table corresponding to the received AAM level, from the database of seek time tables, the seek time tables corresponding to each AAM level.

16. The write reordering method as claimed in claim 12, wherein the computing operation comprises:

computing the plurality of writing positions on a standby data to be written on the surface of the disk;

computing the seek times and sector arrival times to the plurality of computed writing positions; and adding up the computed seek times and sector arrival times to compute access times.

17. A computer-readable storage medium storing a program to execute a write reordering method, the method comprising:

extracting a seek time table containing seek times corresponding to a desired seektime among different seek times to a surface of a disk via a predetermined database of seek time tables; and reordering an order to write a data in a plurality of writing positions on the surface of the disk by use of the extracted seek time table reorder an order to write a data in a plurality of writing positions on the surface of the disk based upon the one of the different seek times that corresponds to a current seek speed.

18. A computer-readable storage medium storing a program to execute a disk writing method, the method comprising:

computing access times from a current position to a plurality of writing positions on a surface of a disk by use of a desired seek time among different seek times to the surface of the disk via a predetermined database of seek time tables; and writing a data in a position that requires a minimum access time among the computed access times; and reordering an order to write data based upon the one of the different seek times that corresponds to a current seek speed.

19. A method to reorder a plurality of data writing and/or reading operations to occur at a plurality of positions on a disk from an initial order of operations, the method comprising:

extracting a set of seek times required to reach each of the plurality of positions from an initial position, each set of seek times to contain various seek times each of which corresponding to various desired seek speeds with one seek speed being a current seek speed; and reordering the plurality of data writing and/or reading operations based on the one of the various seek times from each set of seek times that corresponds with the current seek speed.

20. The method according to claim 19, wherein the seek speed is a speed of a head moving in a direction that is perpendicular to tracks on the surface of the disk.

21. The method according to claim 19, wherein the seek time is a time required to move a head along a desired track interval in a direction that is perpendicular to tracks on the surface of the disk.

22. The method according to claim 19, further comprising receiving a desired Automatic Acoustic Management (AAM) level.

23. The method according to claim 22, wherein the current seek speed corresponds to the desired AAM level.

24. The write reordering method as claimed in claim 19, wherein the reordering comprises:

determining locations of the plurality of writing and/or reading positions on the surface of the disk;

computing the seek times and sector arrival times to the locations;

summing the computed seek times and sector arrival times to compute access times; and reordering the order of writing the data in dimensional order of the access times.

25. A hard disk drive comprising:

a seek time extracting unit to extract a set of seek times required to reach each of a plurality of positions from an initial position, each set of seek times to contain various seek times each of which corresponding to various desired seek speeds with one seek speed being a current seek speed; and a write/read reordering unit to reorder the plurality of data writing and/or reading operations based on the one of the various seek times from each set of seek times that corresponds with the current seek speed.

26. The hard disk drive according to claim 25, wherein the seek speed is a speed of a head moving in a direction that is perpendicular to tracks on the surface of the disk.

27. The hard disk drive according to claim 25, wherein the seek time is a time required to move a head along a desired track interval in a direction that is perpendicular to tracks on the surface of the disk.

28. The hard disk drive according to claim 25, further comprising an Automatic Acoustic Management (AAM) level receiving unit to receive a desired AAM level.

29. The hard disk drive according to claim 28, wherein the current seek speed corresponds to the desired AAM level.

30. The hard disk drive according to claim 25, wherein the write reordering unit determines locations of the plurality of writing and/or reading positions on the surface of the disk, computes the seek times and sector arrival times to the locations, sums the computed seek times and sector arrival times to compute access times, and reorders the order of writing the data in dimensional order of the access times.

31. The hard disk drive according to claim 30, further comprising a drive controller to generate a signal so as to drive an actuator to move a head across the disk based on the order generated by the reordering of the write reordering unit.

32. The hard disk drive according to claim 31, wherein the drive controller moves the head to a position in accordance with the locations of the disk requiring the shortest access time as determined by the write reordering unit.

33. The hard disk drive according to claim 32, further comprising a first drive to output a signal to the drive controller that the writing and/or reading operation is completed.

34. A computer-readable storage medium storing a program to execute a reordering of a plurality of data writing and/or reading operations to occur at a plurality of positions on a disk from an initial order of operations, the method comprising:

extracting a set of seek times required to reach each of the plurality of positions from an initial position, each set of seek times to contain various seek times each of which corresponding to various desired seek speeds one seek speed being a current seek speed; and reordering the plurality of data writing and/or reading operations based on the one of the various seek times from each set of seek times that corresponds with the current seek speed.

* * * * *

UNITED STATES PATENT AND TRADEMARK OFFICE
CERTIFICATE OF CORRECTION

| | | |
|---|---|---|
| PATENT NO. | : 7,457,077 B2 | Page 1 of 1 |
| APPLICATION NO. | : 11/046763 | |
| DATED | : November 25, 2008 | |
| INVENTOR(S) | : Jae-sung Lee | |

It is certified that error appears in the above-identified patent and that said Letters Patent is hereby corrected as shown below:

Column 8, Line 2, change "seektimes;" to --seek times;--.

Column 8, Line 19, change "seektime" to --seek time--.

Signed and Sealed this

Tenth Day of March, 2009

JOHN DOLL
*Acting Director of the United States Patent and Trademark Office*